H. LUTZ.
SHOCK ABSORBER.
APPLICATION FILED JAN. 14, 1919.
1,303,343.
Patented May 13, 1919.
2 SHEETS—SHEET 2.
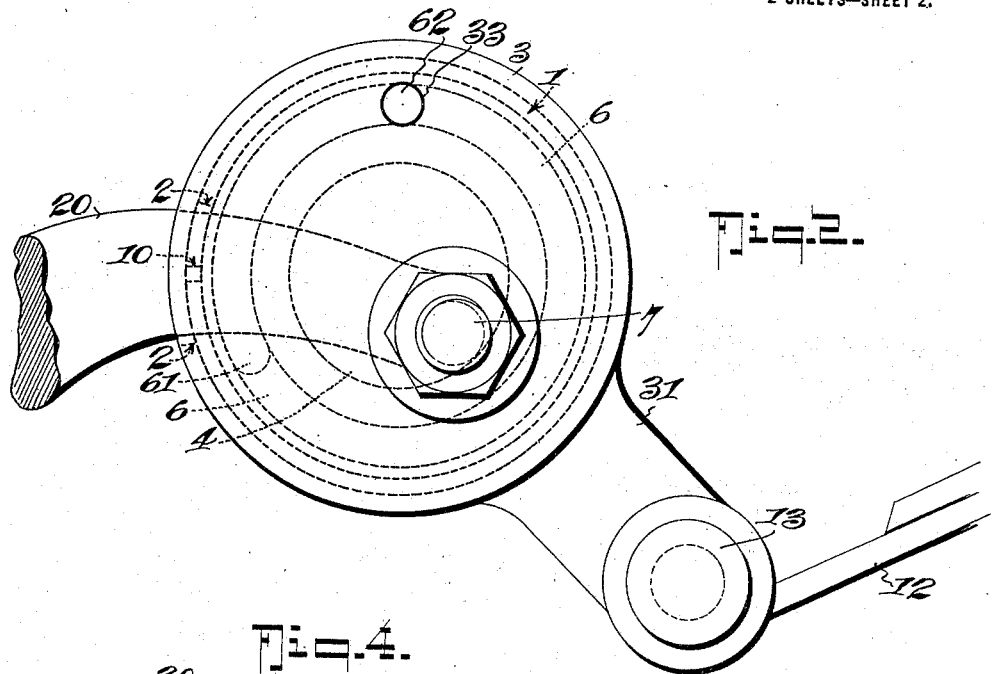
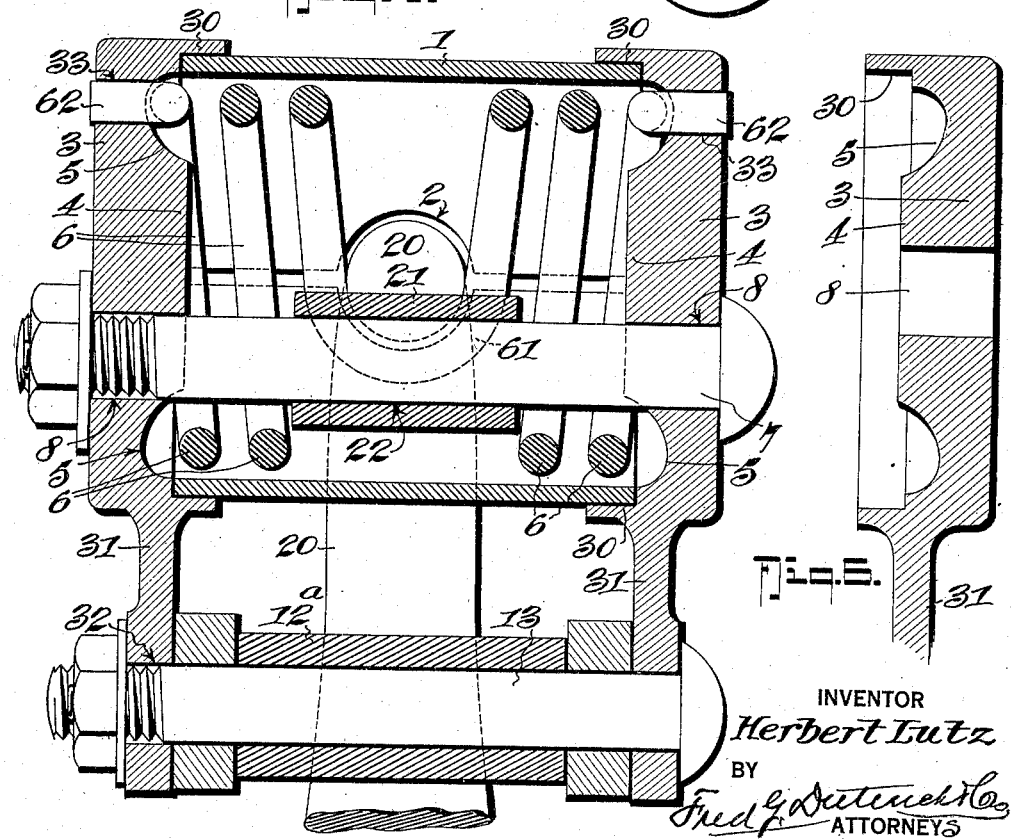
INVENTOR
Herbert Lutz
BY
ATTORNEYS

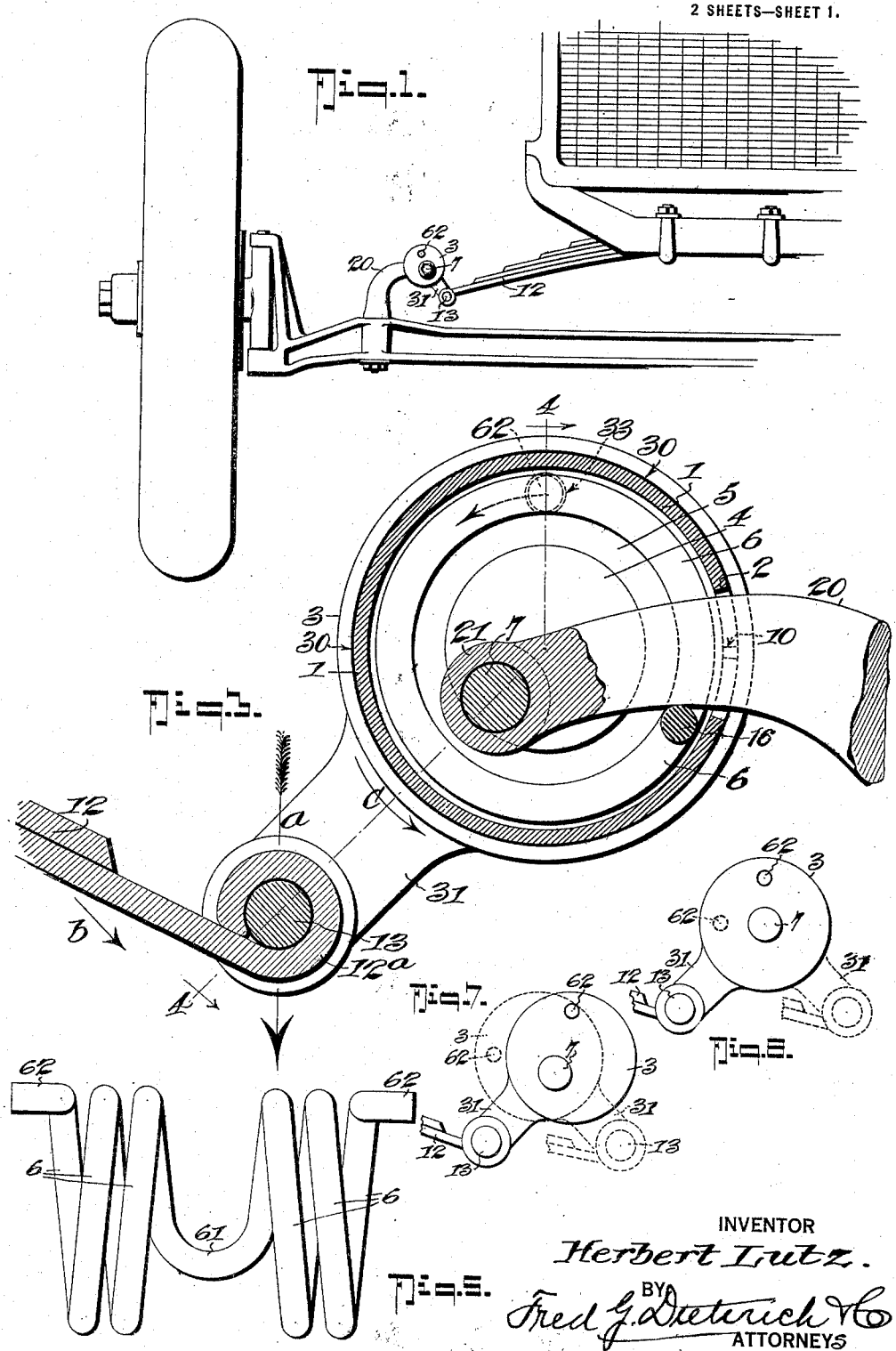

UNITED STATES PATENT OFFICE.

HERBERT LUTZ, OF HAMILTON, ONTARIO, CANADA, ASSIGNOR OF ONE-HALF TO GEORGE MORRIS, OF HAMILTON, ONTARIO, CANADA.

SHOCK-ABSORBER.

1,303,343.  Specification of Letters Patent.  Patented May 13, 1919.

Application filed January 14, 1919. Serial No. 271,079.

*To all whom it may concern:*

Be it known that I, HERBERT LUTZ, a citizen of the Dominion of Canada, residing at Hamilton, in the Province of Ontario, Canada, have invented a new and Improved Shock-Absorber, of which the following is a specification.

My invention has particular reference to that class of shock absorbers that are especially designed for use with springs having the usual shackle connections with an axle or other fixed part and it primarily has for its purpose to provide a shock absorber of the type referred to of a simple and effective construction, in which the parts are coöperatively so arranged whereby to adapt them for being readily assembled for use and held in a compact and stable manner.

Furthermore, my invention has for its object to provide an improved construction of shock absorber that operates to relieve the spring of undue shocks and that furnishes an auxiliary cushioning means adapted for taking up and receiving shocks to which vehicle and other like springs are subjected to, when in operative condition.

With other objects in view that will hereinafter be mentioned, my invention embodies the peculiar and novel features of construction to be first described in detail, specifically pointed out in the appended claims and illustrated in the accompanying drawings, in which:

Figure 1 is a front elevation of a portion of a motor vehicle with my invention applied.

Fig. 2 is a side elevation of my improved shock absorber, the shackle connection being shown in a relatively normal condition.

Fig. 3 is a cross section of my invention and the same illustrates its connection with the perch or relatively fixed bracket and the spring to which it is applied.

Fig. 4 is a longitudinal section thereof taken on the line 4—4 of Fig. 3.

Fig. 5 is a side view of the cushioning or tension spring device hereinafter specifically referred to.

Fig. 6 is a cross section which illustrates a slightly modified construction of one of the combined end or cap members for the cylindrical body.

Fig. 7 is a diagrammatic side elevation of my improved device which illustrates the adjustment of the same during the operation of absorbing a shock.

Fig. 8 is a diagrammatic side elevation of my device having an end cap construction such as is disclosed in Fig. 6 and illustrates the adjustment of the same during the operation of absorbing a shock.

In the practical embodiment of my invention, the body of the device includes a cylindrical casing 1 of suitable flexible material, preferably spring steel. This casing is split horizontally along one side, as indicated by 10, and midway the ends thereof and along the split it is provided with an aperture 2, the purpose of which will presently appear.

3—3 designate end cap plates or members, each of which includes a flanged inner edge 30 for slipping over and making a loose connection with the end of the cylinder 1.

Each cap plate 3 includes a central hub 4 and each of said hubs is formed with an annular groove 5 which constitutes bearings for the end coils for the cushion or tension device that is best shown in Fig. 4, by reference to which and to Fig. 3, it will be noticed that when my shock absorber is applied for use, the cylinder is fitted over the free end of the perch or bracket 20, which end of the bracket projects through the aperture 2 provided therefor in the split cylinder.

By reason of splitting the cylinder 1, as stated, means are provided for easily slipping the said cylinder over and onto the bracket end as shown.

The cushioning or tension spring device, before referred to and shown in detail in Fig. 5, and whose special construction and its connection with its coöperating parts, forms an essential feature of my invention, consists of two end coils 6—6 that are connected by a ceneral U shaped loop 61, which latter, when the parts are assembled for use, passes under and has bearing against the neck of the perch or bracket 20.

By referring more particularly to Fig. 4 it will be seen that the end members of each set of coils 6—6 seat in the annular grooves in their respective adjacent cap members 3 and the free ends of the said end members of the coils are each bent outwardly at right angles as at 62 and are projected through apertures 33 in the cap members, which apertures are located adjacent the flanged ends of the cap members, as shown.

The inner end of the perch 20 terminates in a shackle sleeve 21 in which is received a shackle bolt 7 that projects through the cylinder 1 and through apertures 8—8 in the cap or end members 3—3. The apertures 8—8 in the members 3—3 may be disposed centrally of the said members 3—3, as shown in Fig. 6, but I prefer to place them eccentrically with respect to the said members 3, as shown in Fig. 4, since my arranging them eccentrically, as stated, gives the spring device more purchase on the shackle connection.

Each end member 3 has an integral extension 31 and each of the said extensions has an aperture 32 at the outer end for the reception of the shackle bolt 13 that connects with the shackle sleeve 12ª of the spring 12.

By reason of the peculiar construction and arrangement of the parts that constitute my shock absorber, as described and shown, it is apparent that when the spring is subjected to sudden shocks or pressures in the direction indicated by the arrow $a$ in Fig. 3, the ends of the spring tend to spread in the direction indicated by the arrow $b$, and such adjustment of the spring ends will cause the arms 31, with their respective end members 3—3, to turn in the direction indicated by the arrow $c$ eccentrically on the shackle bolt connection 7, it being understood that the tension spring device, owing to its connection with the perch or fixed bracket 20 and the connection in the ends of the said spring device with the end members 3—3, cushions or takes up the shocks or sudden jolts or pressures exerted on the spring and thereby relieves such spring from undue strain.

The construction described is exceedingly simple and the parts are individually so shaped that they may be easily manufactured and assembled for use.

What I claim is:

1. An appliance of the character described comprising a casing having an opening at one side to adapt it for being fitted over the free end of a relatively fixed bracket, a pivotal connection between said bracket end and the casing, a body supporting spring, the said casing including extensions, a shackle connection that joins the said extensions and the end of said supporting spring, and a shock take-up cushioning device within the casing having a relatively fixed connection with the casing and held under tension to bear against such portion of the bracket that extends within the casing.

2. The combination with a body supporting spring and a relatively fixed member, the latter including a bracket or perch end; of a shock absorbing appliance comprising a casing having an opening at one side for fitting over and onto the perch end of the fixed member and having fixed radial extensions, a shackle coupling that connects the fixed extensions with one end of the spring, a shackle connection that joins the free end of the fixed bracket member and the casing and a shock take-up tension device within the casing that has a relatively fixed connection with the casing and is held under tension to bear against the bracket member that extends within the casing.

3. The combination with a body supporting spring and a relatively fixed member, the latter including a bracket or perch end; of a shock absorbing appliance comprising a casing having an opening at one side for fitting over and onto the perch end and having fixed extensions, a shackle that connects the fixed extensions with one end of the spring, a shackle connection that joins the free end of the fixed bracket member and the casing and a shock take-up tension device within the casing that has a relatively fixed connection with the casing and is held under tension to bear against the bracket member that extends within the casing, the said tension device consisting of a spring wire bent to form opposite end coils, and a central U shaped loop that merges with the end coils, means for fixedly connecting the terminals of the end coils with the ends of the casing, the said U shaped loop portion being adapted for fitting under tension against the bracket member within the casing.

4. A shock absorber of the character described, comprising a casing composed of a cylinder of flexible material having a horizontal split along one side and an aperture on the split line whereby to provide for fitting the said cylinder over the perch end of a fixedly held bracket, members that constitute end closures for the cylinder, the said cylinder end closures having each a radial extension provided with an aperture adapted for receiving a shackle for connecting the absorber with the end of an elliptical spring, a shackle connection that joins the end of the bracket perch with the end closures for the cylinder, each of the end closures having an aperture, a cushion or tension spring device located within the cylinder, the said device including opposite end coils, and a central U shaped loop that merges with the said end coils, the said loop being adapted for engaging the under side of the bracket or perch when the parts are operatively assembled, the end of each of the said end coils being laterally extended for fitting through the apertures in their respective cylinder end closures.

5. The combination with a body supporting spring and a fixedly held member that includes a laterally extending bracket end or perch, the latter terminating in a sleeve; of a shock absorber comprising a cylindrical casing of flexible material that is horizontally split along one side and has an aperture on the split line, whereby the said casing can be fitted over the fixed bracket or perch, members that constitute end closures for the cylindrical casing, the said members each having a radial extension provided with an aperture, a shackle for connecting the said apertured extensions with one end of the body spring, a shackle bolt that passes through the casing end closures and the sleeve on the fixed perch or bracket member, each of the end closures having an aperture, a cushion or tension spring device located within the cylinder, the said device including opposite end coils and a central loop that merges with the end coils, the said loop being adapted for engaging the under side of the bracket or perch when the parts are assembled, the end of each of the said end coils being laterally extended for fitting through the apertures in their respective cylinder end closures.

HERBERT LUTZ.

Witnesses:
F. W. LLOYD,
A. D. BATES.

Copies of this patent may be obtained for five cents each, by addressing the "Commissioner of Patents, Washington, D. C."